INVENTOR.
William G. Reynolds
BY Glenn & Jackson
Attorneys

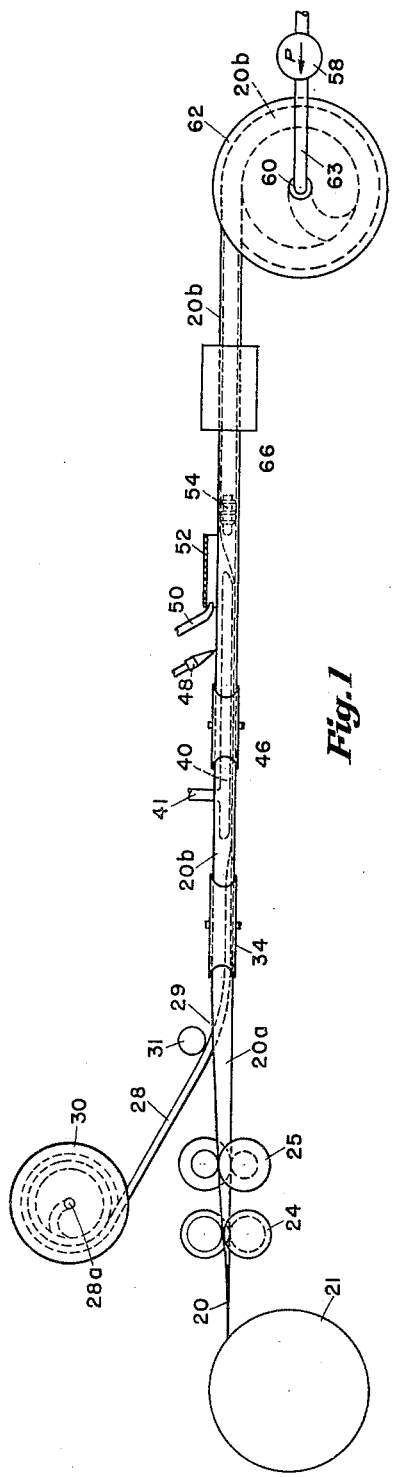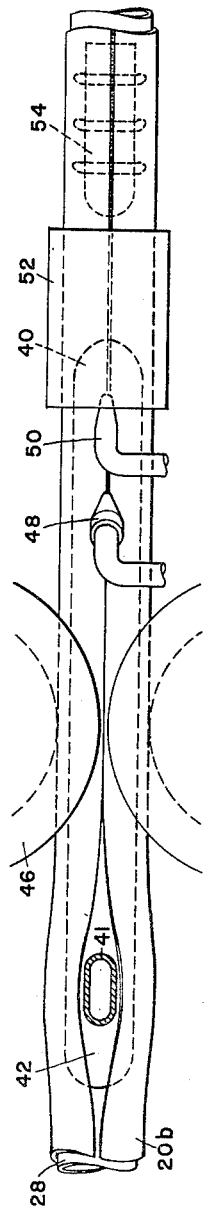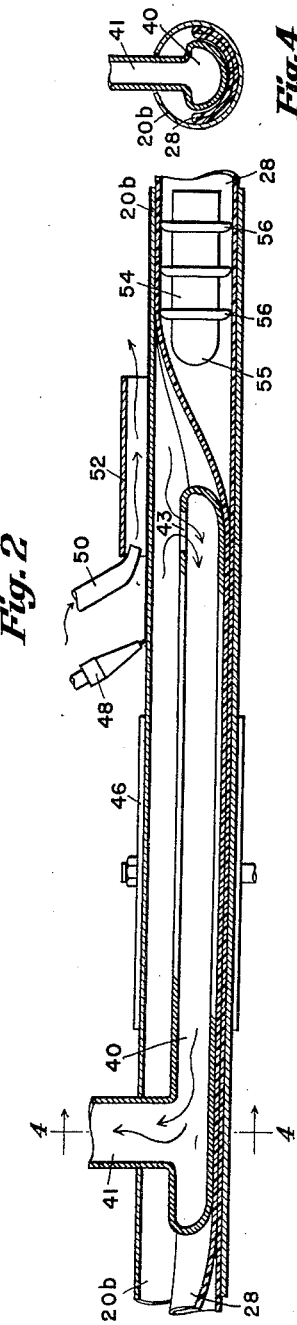

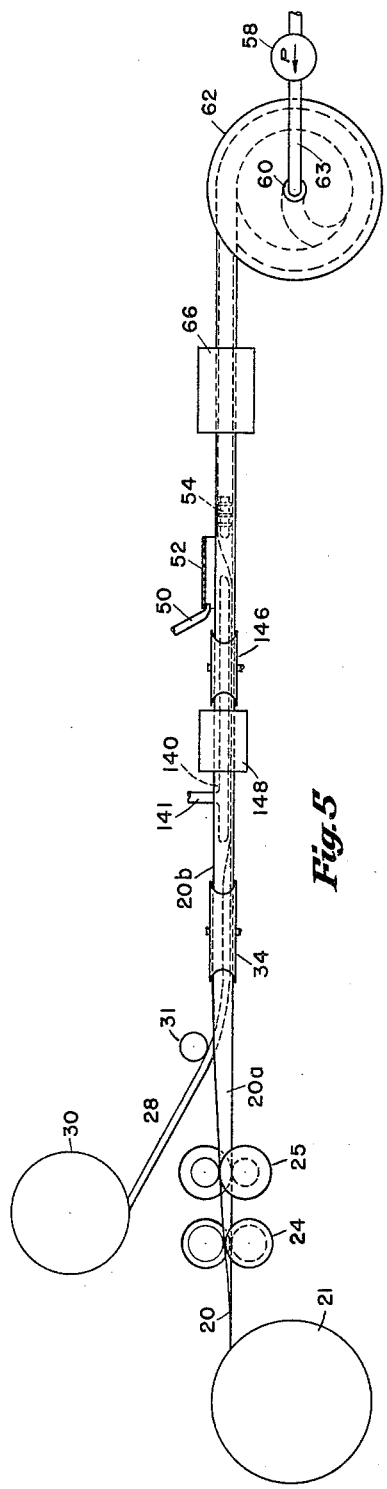
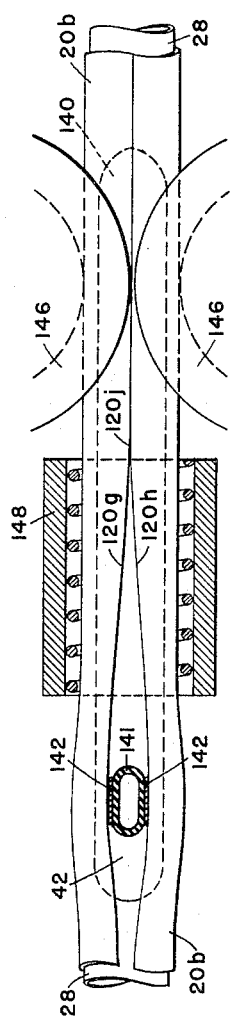
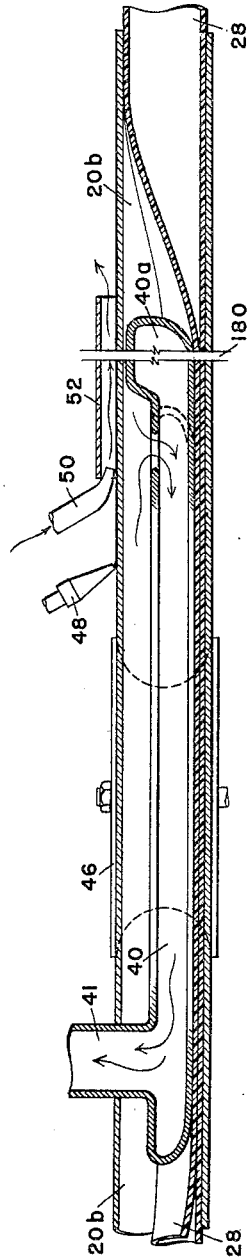

United States Patent Office 3,069,763
Patented Dec. 25, 1962

3,069,763
METHOD AND APPARATUS FOR MAKING PLASTIC LINED CONTINUOUSLY WELDED ALUMINUM TUBING
William G. Reynolds, Anchorage, Ky., assignor to Reynolds Metals Company, Richmond, Va., a corporation of Delaware
Filed Apr. 20, 1959, Ser. No. 807,578
13 Claims. (Cl. 29—429)

This invention is directed to a method of making plastic lined sheet metal tubing progressively and continuously.

Several methods and apparatus have been suggested in connection with the manufacture of multiple layer sheathed tubes or cables. For example, the patents to Greenfield, 469,662; Witzenmann, 830,695; and Boetelink, 2,758,366, disclose ways of placing a metal sheath around a tube. However, there is no disclosure how simultaneously to weld a seam of the outer metal sheath without unduly heating and injuring the internal tube, if such tube is made of flexible or plastic material.

The patents to Lavens, 570,256, and Garten, 2,745,778 disclose coaxial inner flexible tubes and outer metal sheaths, in which the relative diameters of the coaxial tubes are changed to secure the tubes together. However, there is no disclosure whereby the outer sheath can be seam welded in a continuous operation with the methods disclosed in the patents.

The patents to Munger, 2,417,881 and 2,440,725, disclose an inner plastic tube coaxial with an outer metal sheath, the inner tube being expanded, and both tubes being heated to a relatively low adhesion temperature. However, this operation cannot be accomplished simultaneously with seam welding of the outer sheath, and also there is no way whereby the air between the outer tube and the inner tube may be effectively removed throughout the length of a long tube while the plastic tube is being expanded.

The patents to Johnson, 1,794,902; Westlinning, 2,029,044; and Kinghorn, 2,697,772 disclose methods whereby an insulated electric cable may be covered with a strip of sheet metal, and the strip seam welded around the cable. However, these patents rely upon the fact that the electric cable is of a relatively solid nature, and this feature is relied upon for the success of the operation.

No way of expanding a plastic tube within the sheath simultaneously with a seam welding operation is disclosed, in a manner to avoid damage to the plastic tube by the welding heat, and still accomplish adhesion of the tubes after the seam weld in a continuous manner.

All of the foregoing objections or shortcomings in connection with the manufacture of plastic lined tubing are overcome by this invention, as will become apparent.

According to this invention, a novel method, and a novel apparatus for practicing such method, are provided in which a metal sheet strip, preferably made of aluminum or an alloy thereof, is progressively folded into a relatively wide open seam tube. A flexible tube is progressively introduced into such wide open seam tube and then the open seam tube is further folded into a more fully closed open seam tube. A zone is maintained within such open seam tube in which the flexible tube is maintained in relatively tight folded position away from the welding heat by means extending through said open seam. The open seam is then closed and welded adjacent the above zone. A fluid under pressure is introduced into the downstream end of the flexible tube, and this pressure is arrested adjacent the relatively tight folded condition zone of the flexible pipe so the flexible tube is expanded outwardly against the metal tube to cause adhesion between the metal and flexible tube.

Because of this novel method and apparatus, it is possible continuously to make a plastic lined sheet metal tube very cheaply and efficiently.

This invention also relates to a method, apparatus, and product wherein a plastic pipe is placed within a sheet metal tube having relatively small or minute perforations which permit the air between the tubes to escape outwardly through the perforations while the plastic tube is being expanded against the inside wall of the metal tube. Such a tube may be used with the perforations in their original condition when the environment of use is not harmful to the plastic pipe. The perforated metal sheet sufficiently protects the plastic pipe against physical harm under these conditions. However, if desired, the diameter of the outer sheet metal tube may be reduced substantially to close the perforations to a degree wherein, under more adverse conditions of use, substantially no harm can occur to the plastic pipe.

Other objects and features of this invention will become apparent as the description proceeds with reference to the accompanying drawings in which:

FIGURE 1 is a diagrammatic side view representation of an apparatus and method for processing plastic lined sheet metal tubing, in which the seam of the metal tube is gas or arc welded.

FIGURE 2 is a top plan view, on an enlarged scale, of a portion of FIGURE 1.

FIGURE 3 is a vertical, longitudinal, cross-section of FIGURE 2.

FIGURE 4 is a transverse cross-section taken along the line 4—4 of FIGURE 3.

FIGURE 5 is a view similar to FIGURE 1, in which the seam is inductively welded.

FIGURE 6 is an enlarged top view of part of FIGURE 5.

FIGURE 7 shows part of FIGURE 1, on an enlarged scale, showing how certain features of FIGURE 1, or similarly of FIGURE 5, may be omitted, and others added.

Figure 8:
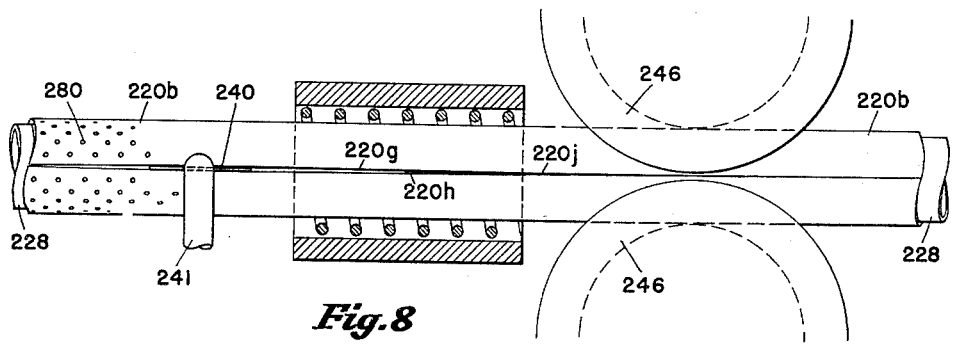
FIGURE 8 shows how a part of apparatus and method similar to that disclosed in FIGURES 1, 5 and 7 may be used with a perforated sheet metal strip.

In FIGURE 1 through 4, a strip of sheet metal, preferably made of aluminum or an alloy thereof, is indicated by the numeral 20 and is progressively fed from the reel 21. It progresses or travels past folding means, such as rollers 24 and 25, by which the strip 20 is progressively folded into a relatively wide open seam tube, indicated by the numeral 20a. A flexible tube 28 is progressively introduced into the open seam tube 20a at 29 from the reel 30, under the guidance of the roller 31.

The flexible tube 28 may be a plastic tube, made preferably of a thermoplastic material, such as polyethylene. The polyethylene preferably is of the nature that remains relatively firm in temperatures up to 300° or 400° F. If the selected polyethylene does not become adhesive at these temperatures, it may be coated with a material which does become adhesive at a lower temperature, or at these temperatures, and such material may be polyethylene having lower temperature adhesive characteristics.

Preferably, the flexible tube 28 is so wound around the reel 30 that air under pressure in said tube 28 may readily escape through the "upstream" end 28a of the tube 28. In this manner, any substantial rise in air pressure is prevented on the upstream side of the tube 28, for a purpose hereafter to become apparent.

The tube 20a is progressively further folded by the rollers 34 into a more fully closed but still open seam tube 20b.

A relatively long, hollow shoe 40 is supported by the suction outlet pipe 41 through the open seam of the tube 20b. If necessary, the shoe pipe 41 partially reopens the seam of the metal tube 20b as indicated at 42 in FIGURE 2. The shoe 40 is hollow, and semi-cylindrical in transverse section, as indicated in FIGURE 4, so that it maintains a zone wherein the plastic tube 28 is maintained in a relatively tight folded condition, as shown in FIGURE 4, so that only a very slight amount of air under pressure can pass through this zone from the downstream side of tube 28 to the upstream side of the tube 28.

The shoe 40 is provided with an air inlet at 43 so that air within the tube 20b is withdrawn through the opening 43 and flows through the shoe 40 and suction outlet 41 to a suction pump, not shown, thereby maintaining the zone adjacent the shoe 40 in relatively cool condition, and particularly the flexible tube 28 and the lower part of the metal strip 20b.

Adjacent to, or above, the zone of the shoe 40, the open seam of the metal strip 20b is closed by the rollers 46, and the seam is welded by a welding head 48 which operates by gas or electric arc. If desired, cooling air may be introduced by the nozzle 50 under the hood 52 to cool the metal tube after the welding operation. The shoe 40 may have an extension 40a, shown in FIGURE 7, which is sufficiently long to permit substantial cooling of the seam weld. This extension 40a may also extend upwardly to contact the upper part of the tube on both sides of the seam, to brace the shoe 40 against upward movement at that end.

If desired, a fluid valving and/or flexible tube spreading device 54 may be introduced into a downstream side of the flexible tube 28. For example, this device may have a blunt front end 55 and one or more circular fins 56 which are adapted to valve the fluid or air under pressure on the downstream side of the tube 28 and to prevent any substantial travel of such air past the device 54 into the upstream side of the tube 28. The device 54 tends to travel leftward in FIGURES 1, 2 and 3, being propelled by air under pressure delivered by the pump 58 into the downstream end 60 at the center of the reel 62 on which the completed multiple layer tubing is wound. The device 54 is introduced into the tube 28 before attachment of the pump discharge pipe 63 to the end 60 of the tube 28. Suitable rotary seal connections are provided between the pipe 63 and the plug in the end 60 as is obvious. The leftward travel of the device 54 is arrested by the shoe 40, or its extension 40a, so the device 54 cannot pass the tight folded zone of tube 28. Any slight amount of air which may pass the device 54 and the tightly folded zone of the tube 28 around the shoe 40 is free to travel up the tube 28 and out at the upstream end 28a of the tube 28, thus to maintain a relatively low air pressure within the upstream side of the tube 28, without materially unfolding the upstream portion of the tube 28.

Preferably, a heating zone 66 is provided through which the tubes 20b and 28 travel on the way from the welding apparatus to the reel 62. This heating zone is maintained at a sufficiently high temperature to heat the tubes 20b and 28 to a temperature sufficient to cause adhesion between the flexible tube 28 and the tube 20b. This zone may be heated by gas, electric resistance, or electric inductance heaters, and may be thermostatically controlled in response to the temperature of tube 20b, or any other temperature, to maintain the desired temperature conditions. The pressure of the fluid or air within the downstream side of the tube 28 aids in insuring outward pressure in the tube 28 to produce the correct adhesion between the tubes 28 and 20b at the heating zone 66.

The spreading device 54 may be a ball of metal or the like and of the proper diameter, in lieu of the device illustrated.

In the embodiment shown in FIGURES 5 and 6, all of the elements indicated thereon by numbers below 100 operate substantially in the same manner, and have the same construction, as in FIGURES 1 to 4. However, those which are numbered in FIGURES 5 and 6 above the numeral 100 and below the numeral 200 operate more or less differently from elements in FIGURES 1 to 4, in a manner now to be described.

The shoe 140 and shoe pipe 141 in FIGURES 5 and 6 have substantially the same shape as the shoe 40 and shoe pipe 41 in FIGURES 1 to 4, except that the shoe 140 is made of a rigid electrically insulating material in which electric current cannot be materially induced or transmitted. Likewise, the suction tube 141 is substantially of the same shape as tube 41 in FIGURES 1 to 4, except that it also is made of the same insulating material as the shoe 140. In addition, plates 142 of metal, or the like, are secured on each side of the tube 141, and these plates 142 are electrically insulated from each other. They prevent the edges of the tube 20b from cutting into the insulating material of the tube 141, but do not short circuit the induced currents in tube 20b.

A pair of rollers 146 causes the seams 120g and 120h gradually to converge and meet at 120j in abutting relationship adjacent the rollers 146. A high frequency induction coil 148 is placed around the tube 20b and around the zone on which the edges 120g and 120h are converging, as shown in FIGURE 6. The induction coil 148 may be of any well known type and may operate on the well known induction welding principle, which is described, for example, in the patent to Kinghorn No. 2,697,772, patented December 21, 1954. The coil 148 causes an induced welding current to flow and to produce a very intense heat at approximately the point 120j where the seam edges 120g and 120h meet. This produces a seam weld without appreciably heating the remainder of the tube 20b to a harmful temperature. The shoe 140 maintains the flexible tube 28 in the lower part of the tube 20b away from the welding heat during the welding operation in the same manner as in FIGURES 1 to 4. Thereafter, the tube 20b may be operated upon by the members 50, 52, etc., substantially as in FIGURES 1 to 4 and may be wound around the reel 62, with air pressure added to the flexible tube by a pump 58 substantially in the same manner as in FIGURES 1 to 4. The details which are substantially identical with those in FIGURES 1 to 4 are not further described.

FIGURE 7 shows specifically how certain features of FIGURES 1-4 may be omitted and/or others added. It is also obvious that these features may be omitted and added to the embodiment shown in FIGURES 5 and 6, without the necessity of repeating the illustration. In FIGURE 7, the flexible tube spreading device 54 of FIGURES 1-4 and 5 and 6 may be omitted, and in lieu thereof the squeezing action of the shoe 40, or 140, is made sufficient to prevent any substantial harmful leakage of compression air from the downstream side (right hand side in FIGURES 1-7) of the tube 28 to the upstream side. Any small amount of air that does leak past the zone of shoes 40 or 141 is allowed to escape with sufficient rapidity through the upstream side of the tube 28 and through the upstream end 28a without substantially unfolding the tube 28 on the upstream side. Otherwise, the elements corresponding thereto which are illustrated in FIGURES 1-6 may operate as previously described with the complete systems which are illustrated in FIGURES 1 and 5.

Another feature which is illustrated in FIGURE 7, and which may be added to corresponding elements in either FIGURES 1–4 and/or FIGURES 5 and 6, is that an extension 40a may be added to the right-hand end of the shoe 40, or shoe 140, which is sufficiently long to permit a very substantial cooling of the seam weld. This extension 40a may also extend upwardly to contact the upper part of the tube 20b on both sides of the seam to brace the shoe against upward movement at that end. A break in FIGURE 7 is shown at 180 to indicate that the extension 40a may be of considerable length. It is thus understood that the corresponding extension in FIGURES 5 and 6 will be of the same insulating material as the shoe 140, whereas such extension 40a in FIGURES 1–4 may be of metal or any other desired material, since no electric currents are induced in the structure of FIGURES 1–4.

Figure 9:
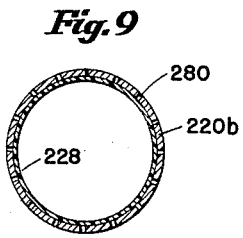
FIGURE 9 is a cross-section of a finished, or partially finished, tube produced by the method disclosed in FIGURE 8.
Figure 10:
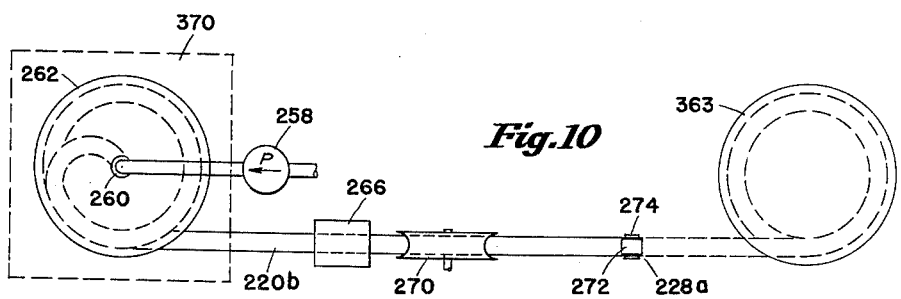
FIGURE 10 is a diagrammatic side view representation of an apparatus and method for further processing the tubing disclosed in FIGURES 8 and 9.

In the embodiments of FIGURES 8–10, a perforated tube 220b may be made from a perforated metal sheet, preferably of aluminum or an alloy thereof, substantially by the same apparatus and steps disclosed in connection with FIGURES 5 and 6 (or FIGURES 1–4) except that the pressure pump 258 is not operated while the tubes 220b and 228, corresponding to tubes 20b and 28, are being wound around the reel 262, which is shown in FIGURE 10. Instead, the flexible tube 228 is allowed to remain in collapsed condition while being wound around the reel 262. The shoe 240, similar to shoe 140 of FIGURES 5 and 6, may be incorporated in the apparatus of FIGURE 8, but need not be of the same lateral and longitudinal extent and need not press downwardly as tight as in FIGURES 5 and 6. However, it should be sufficient to maintain the folded tube 228 in the lower part of the tube 220b. Accordingly, the tube 241 and the shoe 240 are illustrated in FIGURE 8 as not producing the same amount of seam spreading action as shoe 140 and tube 141 in FIGURES 5 and 6, but a substantial amount of spreading is produced, which is sufficient to prevent the flow of current between the seam edges 220g and 220h until the tube 220b reaches the joining point at 220j, as is well known in connection with the induction welding principle. The rollers operate substantially in the same manner as the rollers 146 in FIGURES 5 and 6. No heating zone corresponding to heating zone 66 of FIGURE 5 is used between the apparatus of FIGURE 8 and the reel 263 of FIGURE 10.

The plastic tube 228 may be substantially in the same condition as the tube 28 in FIGURES 5 and 6 through the seam welding operation. However, it is not spread out by the spreading device 54, or by pressure from the pump 58 of FIGURE 5, but is allowed to remain in collapsed and unheated condition until the tubing is wound completely on the reel 262.

Thereafter, the tubes 220b and 228 are unreeled from the reel 262, as illustrated in FIGURE 10, for example, by being pulled by a set of rollers 270 or by a reel 362. The rollers 270 may be diameter reducing rollers if desired, or merely frictional pulling rollers which produce practically no diameter reduction of the tubes 220 and 228. The end 228a of the flexible pipe 228 is closed as by a plug 272 which is inserted in the end 228a of the pipe 228 and is clamped by a strap 274 around both of the pipes 228 and 228b. A heating means 266, which may be a gas heating oven, or an electric heating oven of resistance or induction type is provided to heat the pipes 220b and 228 to the desired adhesion temperature. Air under pressure is supplied by the pump 258 to the end 260 of tube 228, and the two tubes 228 and 220b are caused to adhere together as they are heated in the heating zone 266 by the pressure inside of the pipe 228. If desired, the completed pipe may be wound around the reel 362.

The completed tubing produced by the apparatus shown in FIGURES 8 and 10 has a cross-section diagrammatically the same as shown in FIGURE 9 except that the openings 280 may actually be of smaller diameter and may be closer together relatively to the diameter of the tubing than is diagrammatically illustrated in FIGURES 8 and 9.

The total area of the openings 280 is sufficient to allow any air in tube 220b, which is present while the tubing 228 is in collapsed condition, to escape through the openings 280 by the time that the tubing reaches an adhesion temperature in the heating zone 266. The final escape of the air through the openings 280 may continue for a certain length of travel of the tubing, while still hot, beyond the heating zone 266, if desired. The pressure produced by the pump 258 as the tubes unwind from the reel 262 spreads the tubing 228 outwardly until it is completely in contact with all of the inside of the tube 220b. The length of the heating zone 266 may be considerable, so that substantially all of the escape of the air through the openings 280 can take place before the tubes leave the heating zone where the tubing 228 is being heated and rendered more flexible.

The rollers 270, or a plurality of such rollers, may be used to reduce the diameter of the tubings 220b after the tubing 228 has been blown outwardly. This causes the openings 280 to become smaller and to produce a certain amount of gripping action of the tube 220 with respect to the tube 228.

The reel 362 alone may be used to pull the pipes 220b and 228 through the heating zone 266 from the reel 262. Under these conditions, if the diameter reduction is not desired, the rollers 270 may be omitted and all of the pulling action may be produced by the reel 362.

Also, if desired, the reel 262, in FIGURE 10, or a plurality of reels 262, may be placed in an oven 370 where the tubes 220b and 228 may be slowly heated to any desired temperature which may be as high as the adhesion temperature. The end or ends 228a of the tube or tubes 228 may be plugged, as indicated at 272 and 274 within or just outside the oven 370. The pump 258 may be connected to the end or ends 260 of such tube or tubes 228 and air under pressure may be applied to the tubes. The reel or reels may remain in the oven 370 while the tube or tubes 228 expand and adhere to the interior surface or surfaces of the tubes 220b while air in the tubes 220b escapes, while in the oven 370, through the perforations 280. The tubes may then be unreeled and be reeled on other reels 363, or the reels 262 may be used for shipment of the tubes.

The tubing as disclosed in FIGURES 8 to 10 may be used without reduction of diameter, if the size of the openings 280 is sufficiently small to protect the tubing 228 from harm from the medium expected to surround the tubing 220b. The diameter may be reduced where it is desired to make the openings 280 smaller in order to afford greater protection to the tubing 228. The original diameter of the opening 280 may be sufficiently small that they are substantially closed by the tube diameter reducing process herein described with respect to FIGURE 10.

Under certain conditions, the perforations in tube 220b may be a series of groups of relatively large openings in spaced zones along the length of the tube 220b while the intermediate parts of the tube 220b are not perforated. These zones are spaced apart selected distances so the air between the tubes 220b and 228 can escape through said large openings, and relatively short unperforated tubes may be cut between the zones of large openings. These short tubes may be used as short, plastic lined, unperforated sheath tubes where long tubes are not necessary.

Figure 11:
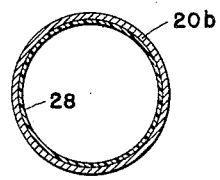
FIGURE 11 is a cross-section of the final tube product of FIGURES 1 through 7.

FIGURE 11 shows the cross-section of the plastic lined tubing which is produced by the apparatus and method disclosed as in FIGURES 1 through 7.

While the form of the invention now preferred has been disclosed, as required by statute, other forms may be used, all coming within the scope of the claims which follow.

What I claim is:

1. An apparatus for continuously forming multiple layer tubing comprising: means for progressively folding a sheet metal strip into an open seam tube; means for progressively introducing a flexible, resilient tube into said open seam tube said flexible tube being formed of a material that is not capable of withstanding a certain temperature; a shoe adapted to be supported through said open seam and adapted to hold said flexible tube in collapsed condition away from said seam; means for closing and welding said open seam adjacent said shoe said welding means being of a type that produces said certain temperature that would damage said flexible tube if said flexible tube were disposed adjacent said seam; a flexible tube spreading device adapted to be placed in said flexible tube on the discharge side of said shoe; and means for introducing a fluid under pressure into the downstream end of said flexible tube to expand said flexible tube between said downstream end and the proximity of said shoe by the action of said device.

2. An apparatus for continuously forming multiple layer tubing comprising: means for progressively folding a sheet metal strip into an open seam tube; means for progressively introducing a flexible, resilient tube into said open seam tube, said flexible tube being of a material that is not capable of withstanding a certain temperature; a shoe adapted to be supported through said open seam and adapted to hold said flexible tube in collapsed condition away from said seam; means for closing and welding said open seam adjacent said shoe said welding means being of a type that produces said certain temperature that would damage said flexible tube if said flexible tube were disposed adjacent said seam; and means for introducing a fluid under pressure into the downstream end of said flexible tube to expand said flexible tube between said downstream end and the proximity of said shoe.

3. An apparatus for continuously forming multiple layer tubing comprising: means for progressively folding a sheet metal strip into an open seam tube; means for progressively introducing a flexible, resilient tube into said open seam tube, said flexible tube being formed of a material that is not capable of withstanding a certain temperature; a shoe adapted to be supported through said open seam and adapted to hold said flexible tube in collapsed condition away from said seam; means for closing and welding said open seam adjacent said shoe, said welding means being of the type that produces said certain temperature that would damage said flexible tube if said flexible tube were disposed adjacent said seam; means for introducing a fluid under pressure into the downstream end of said flexible tube to expand said flexible tube between said downstream end and the proximity of said shoe; and means for heating said metal tube on the downstream side of said shoe to cause adhesion between said metal tube and flexible tube.

4. A method for continuously forming multiple layer tubing comprising: progressively folding a metal sheet strip into a relatively wide open seam tube; progressively introducing a flexible, resilient tube into said wide open seam tube, said flexible tube being formed of a material that is not capable of withstanding a certain temperature; progressively further folding said strip into a more fully closed open seam tube; folding and maintaining said flexible tube within a zone in relatively tight folded condition away from said seam; closing and welding said seam adjacent said zone with a welding means that produces said certain temperature that would damage said flexible tube if said flexible tube were disposed adjacent said seam; introducing a valving, spreading flexible tube expander into the downstream end of said flexible tube; and introducing a fluid under pressure into said downstream end of said flexible tube behind said expander to expand said flexible tube between said downstream end and the proximity of said zone with the aid of said expander.

5. A method for continuously forming multiple layer tubing comprising: progressively folding a metal sheet strip into a relatively wide open seam tube; progressively introducing a flexible, resilient tube into said wide open seam tube, said flexible tube being formed of a material that is not capable of withstanding a certain temperature; progressively further folding said strip into a more fully closed open seam tube; folding and maintaining said flexible tube within a zone in relatively tight folded condition away from said seam; closing and welding said seam adjacent said zone with a welding means that produces said certain temperature that would damage said flexible tube if said flexible tube were disposed adjacent said seam; and introducing a fluid under pressure into said downstream end of said flexible tube to expand said flexible tube between said downstream end and the proximity of said zone.

6. A method for continuously forming multiple layer tubing comprising: progressively folding a metal sheet strip into a relatively wide open seam tube; progressively introducing a flexible, resilient tube into said wide open seam tube, said flexible tube being formed of a material that is not capable of withstanding a certain temperature; progressively further folding said strip into a more fully closed open seam tube; folding and maintaining said flexible tube within a zone in relatively tight folded condition away from said seam; closing and welding said seam adjacent said zone with a welding means that produces said certain temperature that would damage said flexible tube if said flexible tube were disposed adjacent said seam; and introducing a fluid under pressure into said downstream end of said flexible tube to expand said flexible tube between said downstream end and the proximity of said zone and heating said metal tube on the downstream side of said zone to provide adhesion between said metal and flexible tubes.

7. An apparatus for continuously forming multiple layer tubing comprising: means for longitudinally feeding a sheet metal strip; means for partially folding said strip into an open seam tube; means for feeding a flexible, resilient, plastic tube into said open seam tube, said plastic tube not being capable of withstanding a certain temperature; means for folding and collapsing said tube away from said seam; means for closing the seam of said open seam tube; welding means for welding said closed seam while maintaining said collapsed plastic tube spaced from said closed seam, said welding means being of the type that produces said certain temperature that would damage said plastic tube if said plastic tube were disposed adjacent said seam; means for introducing fluid under pressure adjacent the downstream end of said plastic tube; and blocking means for blocking said fluid under pressure adjacent said welding means.

8. An apparatus according to claim 7, in which said welding means includes a shoe in said open seam tube supported by an extension passing through said open seam.

9. An apparatus according to claim 7, which includes means for heating said tubes on the downstream side of said welding means.

10. An apparatus according to claim 7, in which said welding means includes a shoe in said open seam tube and a supporting extension extending through said open seam made of electric insulating material, and a high frequency inductance coil adjacent said shoe.

11. An apparatus according to claim 7, in which said welding means includes a shoe in said open seam tube, a supporting extension extending through said open seam and a welding head adjacent said shoe.

12. An apparatus according to claim 7 in which said blocking means includes a valving and spreading device.

13. A method for continuously forming multiple layer tubing comprising: progressively folding a metal sheet strip into a relatively wide open seam tube; progressively introducing a flexible, resilient tube into said wide open seam tube, said flexible tube being formed of a material that is not capable of withstanding a certain temperature; folding and maintaining said flexible tube within a zone in relatively tight folded condition away from said seam during the welding thereof; welding said seam along said zone while said flexible tube is held away from said seam with a welding means of a type that produces said certain temperature that would damage said flexible tube if said flexible tube were disposed adjacent said seam; and expanding said flexible tube after said seam has been welded.

References Cited in the file of this patent

UNITED STATES PATENTS

| | | | |
|---|---|---|---|
| 830,695 | Witzenmann | Sept. 11, | 1906 |
| 2,029,044 | Westlinning | Jan. 28, | 1936 |
| 2,440,725 | Munger | May 4, | 1948 |
| 2,608,501 | Kimble | Aug. 26, | 1952 |
| 2,803,730 | Kinghorn | Aug. 20, | 1957 |

FOREIGN PATENTS

| | | | |
|---|---|---|---|
| 410,748 | France | Mar. 21, | 1910 |
| 1,177,174 | France | Dec. 1, | 1958 |
| 714,105 | Great Britain | Aug. 25, | 1954 |